Apr. 17, 1923.
1,451,833
J. KAURICH
ACCIDENT PROOF AUTOMOBILE FENDER
Filed Aug. 25, 1922 — 4 Sheets-Sheet 1
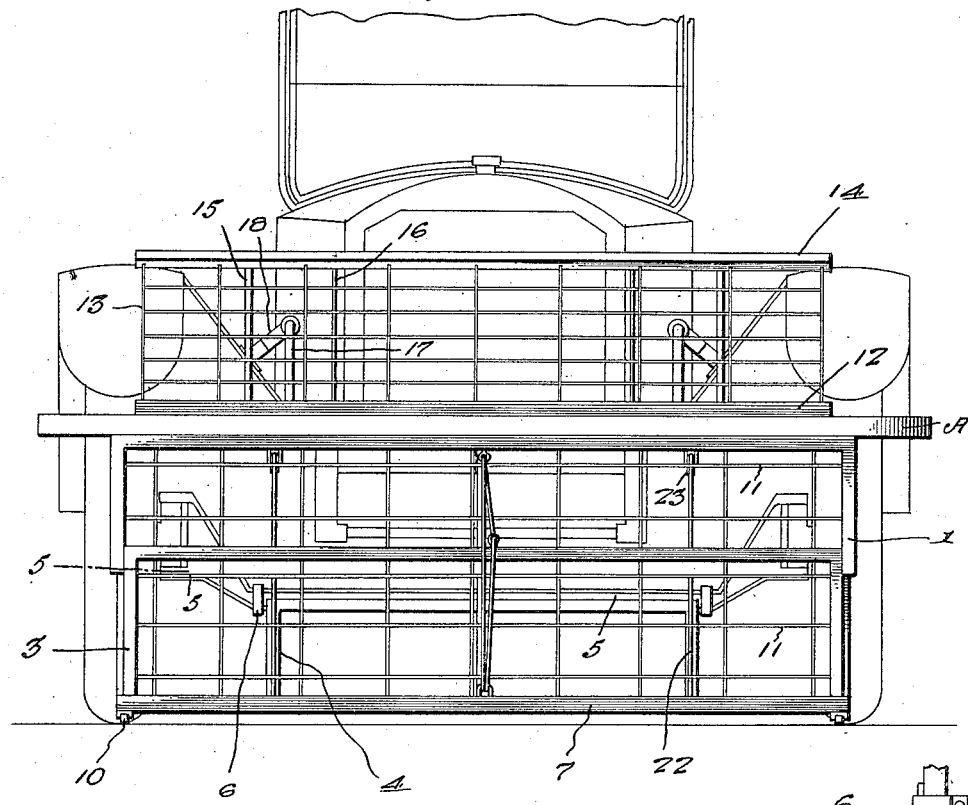
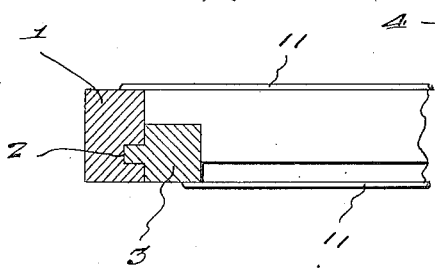
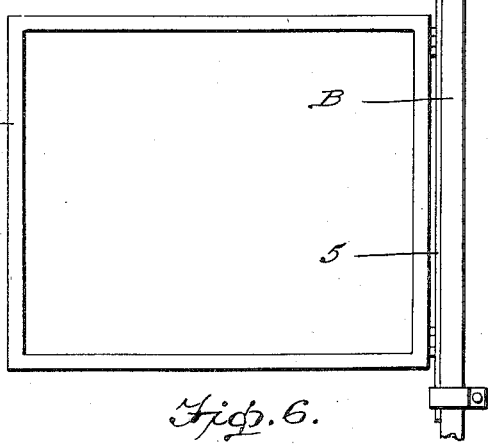
John Kaurich, INVENTOR
BY Victor J. Evans, ATTORNEY
WITNESS:

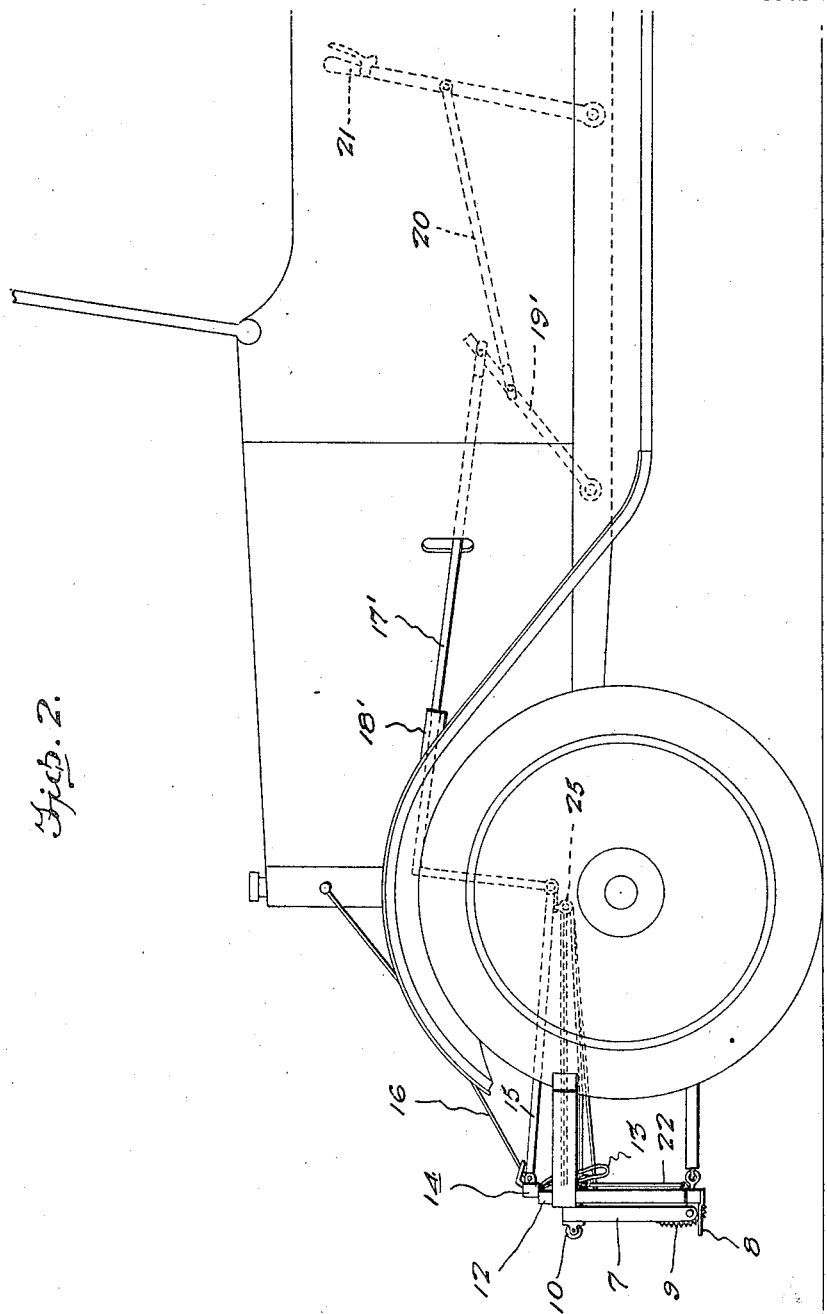

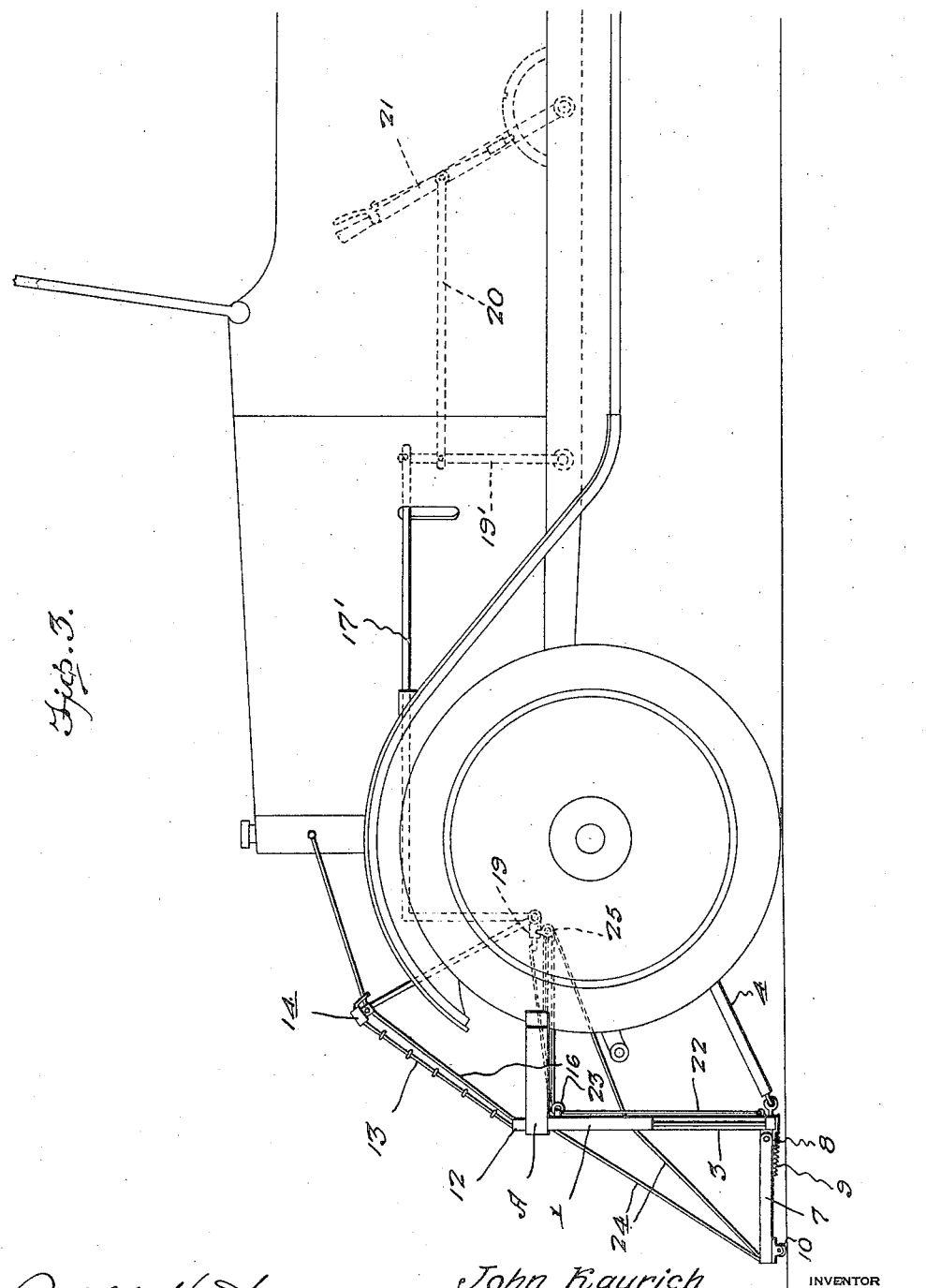

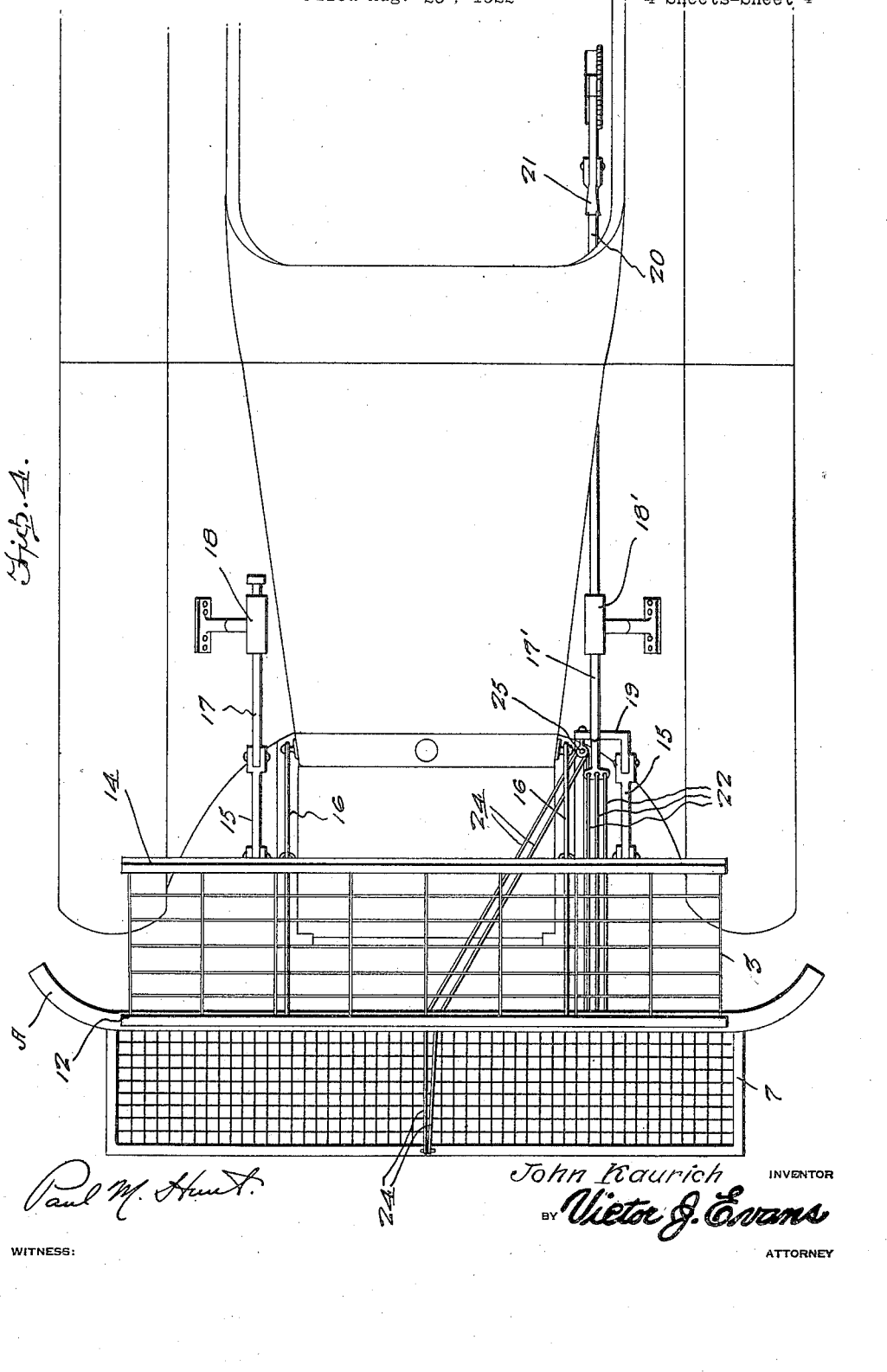

Patented Apr. 17, 1923.

1,451,833

UNITED STATES PATENT OFFICE.

JOHN KAURICH, OF MILWAUKEE, WISCONSIN.

ACCIDENT-PROOF AUTOMOBILE FENDER.

Application filed August 25, 1922. Serial No. 584,362.

*To all whom it may concern:*

Be it known that I, JOHN KAURICH, a citizen of the United States, residing at Milwaukee, in the county of Milwaukee and State of Wisconsin, have invented new and useful Improvements in Accident-Proof Automobile Fenders, of which the following is a specification.

This invention relates to a fender for motor vehicles, the general object of the invention being to provide an adjustable fender which is adapted to be placed at the front of the automobile to prevent persons from being knocked down and run over by the vehicle, with means for adjusting the fender from a point adjacent the driver's seat.

Another object of the invention is to provide means whereby the fender can be supported from the front axle and the front bumper.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a front view of an automobile showing my invention in use.

Figure 2 is a side view showing the parts in raised position.

Figure 3 is a similar view showing the parts in lowered position.

Figure 4 is a plan view.

Figure 5 is a sectional view on line 5—5 of Figure 1.

Figure 6 is a detail view of the supporting frame.

In these views 1 indicates a depending frame which is secured to the bumper A of the automobile. This frame has guideways 2 therein which are engaged by a second frame 3 so that said second frame can be raised and lowered in the first frame. A hinged frame 4 is hingedly connected to a bar 5 which is held to the front axle B by the clips 6. This frame 4 is pivotally secured to the lower end of the frame 3 so that said frame 3 is supported by the frame 4 in its vertical movement. A screen carrying frame 7 is hingedly secured to the lower end of the frame 3, stops 8 limiting the downward movement of said frame 7. Springs 9 act to hold the frame 7 in its lowest position. The bottom of this frame 7 is provided with rollers 10. The frames 1 and 3 carry the usual mesh 11 formed of rope or the like. A bar 12 is connected with the top of the bumper and rope mesh 13 is connected with the bar and with a bar 14 which is pivotally supported by the arms 15 hereinafter to be described. This arrangement of parts forms a net between the bumper and the radiator which may be raised and lowered as desired, the parts being guided by the member 16 which extend between the bumper and the radiator and to which the bar 14 is slidably connected. One arm 15 is pivotally supported by an L-shaped member 17 which is slidably mounted in a bracket 18 carried by one of the fenders of the vehicle. The other arm 15 is pivotally supported by an angle bracket 19 which is connected with an L-shaped member 17' slidably mounted in a bracket 18' on the other fender. This member 17' is connected to a rocking lever 19' which is in turn connected by a link 20 with a hand lever 21 which is arranged adjacent the driver's seat. Cables 22 connect the member 17' with the lower end of the frame 3, these cables passing over suitable guiding pulleys 23. Another cable 24 passes over a pulley 25 on the angle bracket 19 and has its ends connected with the outer end of the frame 7, this cable also passes over suitable guiding pulleys.

From the above it will be seen that when the hand lever is actuated or moved toward the driver the members 17' will be moved inwardly, thus swinging the frame 7 into vertical position, raising the frame 3 into the frame 1 and moving the bar 14 against the bar 12 so as to fold up the net 13. Thus the parts of the fender are in folded position and occupy but a minimum amount of space. If the operator sees that he is about to strike a person or animal he would push forwardly the lever 21 so as to move the parts to a position shown in Figure 3 and thus cause the person to be caught in the fender and thus be saved from injury.

From the foregoing it will be seen that the danger of a person being knocked down and run over by a motor vehicle equipped with this device is obviated as the fender will act to pick the person up if struck and prevent him from coming into contact with the wheels. By making the parts adjustable they can be raised and lowered to suit road conditions.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A fender for motor vehicles comprising a pick-up frame, a member to which said frame is hingedly connected, a frame hinged to said member, a bar connected with the axle and hinged to the last mentioned frame, a member connected with the bumper, a netting connected with the said member and with the member to which the pick-up frame is connected and means for adjusting the pick-up frame in relation to the road surface from a point adjacent the driver's seat.

2. A fender for motor vehicles comprising a frame connected with the bumper, a second frame vertically movable in the first frame, an inclined frame hingedly connected with the lower end of the vertically movable frame, a supporting frame hingedly connected with the lower end of the vertically movable frame and with the axle, netting covering the first, second and third frames and netting extending between the bumper and the front of the automobile.

In testimony whereof I affix my signature.

JOHN KAURICH.